(12) United States Patent
Wu (10) Patent No.: US 6,898,860 B2
(45) Date of Patent: May 31, 2005

(54) AUXILIARY HANDLE WITH A LASER ALIGNMENT DEVICE FOR DRILLS

(75) Inventor: Shuming Wu, Nanjing (CN)

(73) Assignee: Chervon International Trading Co. Ltd., Nanjing (CN)

( * ) Notice: Subject to any disclaimer, the term of this patent is extended or adjusted under 35 U.S.C. 154(b) by 0 days.

(21) Appl. No.: 10/712,317

(22) Filed: Nov. 13, 2003

(65) Prior Publication Data

US 2004/0093749 A1 May 20, 2004

(30) Foreign Application Priority Data

Nov. 19, 2002 (CN) .......................... 02258539 U (51) Int. Cl.[7] .......................... B23B 49/00; G01B 11/26
(52) U.S. Cl. .............................. 33/286; 33/334; 408/16
(58) Field of Search ........................... 33/286, DIG. 21, 33/333, 334, 285, 281, 282, 283

(56) References Cited

U.S. PATENT DOCUMENTS

| | | | | |
|---|---|---|---|---|
| 2,855,679 A | * | 10/1958 | Gibble | 33/286 |
| 4,078,869 A | * | 3/1978 | Honeycutt | 33/286 |
| 4,222,175 A | * | 9/1980 | Bernicky | 33/286 |
| 5,539,990 A | * | 7/1996 | Le | 33/286 |
| 5,797,670 A | | 8/1998 | Snoke et al. | |
| 6,375,395 B1 | | 4/2002 | Heintzeman | |
| 6,499,219 B1 | * | 12/2002 | Wightman | 33/334 |
| 6,587,184 B2 | * | 7/2003 | Wursch et al. | 356/4.01 |
| 6,681,869 B2 | * | 1/2004 | Wursch et al. | 173/2 |
| 2002/0145724 A1 | | 10/2002 | Wursh et al. | |

FOREIGN PATENT DOCUMENTS

| | | | |
|---|---|---|---|
| DE | 100 13 943 A1 | 3/2001 | |
| GB | 2388900 A | 11/2003 | |
| JP | 2002205285 A | * 7/2002 | B25F/5/02 |

OTHER PUBLICATIONS

United Kingdom Patent Office Search Report under Section 17(5) of Patents Act 1977—issued Feb. 9, 2004 for co–pending United Kingdom Application No. 0326883.6.

* cited by examiner

*Primary Examiner*—Christopher W. Fulton
(74) *Attorney, Agent, or Firm*—Wallenstein Wagner & Rockey, Ltd.

(57) ABSTRACT

An auxiliary handle with a laser alignment device for drills comprises a grip portion for grasping, an opened collar which can be engaged with shoulder of the drill, and a clamp means for locking or loosing the opened collar. The auxiliary handle also comprises a first laser generator which can project a fanned planar laser beam, a battery pack which can be used to power the first laser generator, and a switch for turning on or turning off the first laser generator, the fanned laser beam which is projected by the first laser generator is in alignment with the central axis of the opened collar. Such that the fanned laser beam is in alignment with the central axis of the chuck when the auxiliary handle is mounted on the drill.

21 Claims, 6 Drawing Sheets

AUXILIARY HANDLE WITH A LASER ALIGNMENT DEVICE FOR DRILLS

RELATED APPLICATIONS

This application claims priority from Chinese Application No. 02258539.7, filed on Nov. 19, 2002.

FIELD OF INVENTION

The present invention relates to an auxiliary handle with a laser alignment device which can be provided for electric hammer, drill or hammer drill which are powered by alternating current or direct current. The operator only need to align the laser beam projected by the laser generator of the auxiliary handle with the confirmed reference point or line in order to position the drill holes quickly and accurately.

BACKGROUND OF THE INVENTION

The prior auxiliary handles of drill tools are merely used for grasping; there are no devices on the drill to assist the user to determine the position of the hole to be drilled. When the user needs to drill a hole or a series of holes in reference to some objects, he has to manually mark the points for drilling on the surface of an object to be drilled by a ruler and a pen, and possibly even need the aid of a horizontal or vertical indicator, before he can begin to work. Moreover, if the reference objects are far away, it is difficult to attain the alignment with precision.

SUMMARY OF THE INVENTION

It is an objective of the present invention to provide an improved auxiliary handle with a laser alignment device provided for drills. Typical drills in the prior art have a cylindrical shoulder which can be engaged with the collar of an auxiliary handle. Generally, the outside diameter of the cylindrical shoulder is of standard dimension. The inner diameter of the opened collar of the auxiliary handle can be adjusted by a clamp means to accommodate the shoulder portion. Thus, when the clamp means is loosened, the circumference of the collar will enlarge, and the auxiliary handle can be rotated around or detached from the shoulder of the drill; and, when the clamp means is closed or clamped, the auxiliary handle can then be clamped on the drill shoulder, so that it is convenient to position the auxiliary handle in any desired angular orientations for comfortable grasping when drilling in different positions.

It is another object of this invention to provide an auxiliary handle with a laser alignment device, without decreasing the original function of the auxiliary handle. The laser alignment device can project a fanned planar laser beam through an aperture and form a visible line on the surface of the object to be drilled. Since the auxiliary handle can rotate around the shoulder of the drill, when the operator wants to drill a hole or a series of holes in reference to two points, a line or a plane, he just needs to rotate and secure the auxiliary handle on the drill to align the laser line with the referenced points, line or plane, thus enabling the user to drill holes in the desired position directly and accurately.

Specifically, the auxiliary handle with a laser alignment device of the present invention comprises a grip portion for grasping, an opened collar, a clamp means which preferably can be a pair of bolts and nuts for clamping or loosening the opened collar. The auxiliary handle of this invention further comprises a first laser generator, a battery pack to power the first laser generator device, and a switch to control the first laser generator. The laser generator may comprise a housing, a laser diode, lens assembly to focus and fan the light projected by the laser diode into a fanned planar beam. Finally, there is an elongated aperture on the front of the housing wherefrom the light projects, and which is in alignment with the plane of the fanned beam. When the auxiliary handle is clamped on a drill, and the control switch is turned on, the laser generator will project a fanned beam through the aperture forwardly. The plane of the laser beam is parallel to the central axis of the auxiliary handle, and is in the same plane with the major axis of the drill chuck. Considering that some users may be left-handed, it would be preferable that the central axis of the auxiliary handle is aligned with the major axis of the drill chuck such that the laser beam is also aligned with the central axis of the auxiliary handle.

Another object of this invention is to provide a more precise point to be drilled. When it is necessary to drill a hole or a series of holes exactly horizontally, vertically or 45 degrees aligned to a reference object such as a point, a line or a plane, the auxiliary handle can be selectively mounted with one or more level bubbles, which are respectively horizontal, vertical or 45 degrees to the fanned laser beam. Referring to the line on the work piece projected by the laser alignment device, with the aid of the bubbles mounted on the auxiliary handle which are respectively horizontal, vertical or 45 degrees to the laser beam, this auxiliary handle can provide a leveled horizontal line or a plumb line or a 45 degree line reference to the horizontal plane through the referenced object.

A further object of the present invention is to provide an auxiliary drill handle can generate two reference points or lines at the same time. Accordingly, in the present invention, the opened collar of the auxiliary handle may have a sub-handle. A second laser generator which is similar to the first one is mounted on said sub-handle, and it can also be powered by the common battery pack described above and controlled by the same switch in common for the first laser generator. The center axis of the sub-handle can pass through the center of the drill chuck. The second laser generator projects a fanned beam forwardly, which is parallel to the center axis of the sub-handle or within a common plane with the center axis of the sub-handle. Meanwhile, the laser beam projected by the second laser generator has a common plane with the center axis of the drill chuck. Thus, the two fanned beams projected by the first laser generator on the auxiliary handle and the second laser generator on the sub-handle form two lines on the surface of the object to be drilled, and form an intersection point which laps over the center axis of the drill chuck, i.e. the drill bit. The degree of the angle formed by the two laser lines is determined by the angle between the sub-handle and the auxiliary handle. The sub-handle can also be fixed on the auxiliary handle with their axis perpendicular to each other. Thus, the degree of the angle formed by the sub-handle and the auxiliary handle can be adjusted within a range as required for practical use. The adjustable range is preferably from 45 to 180 degrees, and some scale marks on the opened collar adjacent to the sub-handle with 45, 90, 135 or 180 degrees reference to the plane of the first laser planar beam projected by the first laser generator. In this way, a hole position for drilling can be determined in reference to any two points by adjusting the auxiliary handle around the shoulder of the drill and adjusting the sub-handle around the collar of the auxiliary handle.

One or more level bubbles can also be mounted on the sub-handle to indicate the relative position of the laser beam projected by the second laser generator as in horizontal, vertical or 45 degrees reference to horizontal plane. Thus, with the aid of the level bubbles of different position on the auxiliary handle and sub-handle, it is possible to position a hole on a non-level surface more accurately by horizontally, vertically or at 45 degrees referencing to a reference point.

An even further object of the present invention is to provide a sub-handle wherein the laser generator projects a laser beam backward to the drill. Thereby, the operator can take the target behind his or her back as basic reference during the work.

DETAILED DESCRIPTION OF THE PREFERRED EMBODIMENT

Referring to FIGS. 1–4, the auxiliary handle 41 of the present invention can be mounted on a drill 101 to position a reference point or a series of reference points on a work surface. The auxiliary handle 41 comprises a handle portion 1 for grasping, an opened collar 2 for mounting the handle 41 to a shoulder of the drill 101, and a clamp means 3 for locking or loosening the opened collar 2. The auxiliary handle 41 further comprises a first laser generator 6 positioned in the front face 412 of the auxiliary handle 41, a switch 7 used to turn on or turn off the first laser generator 6, a battery pack 8 to power the first laser generator 6, and clamp means 3 may comprise a bolt 31 and a nut 32. For the convenience of a left-handed person, it is preferable that the center axis 411 of the auxiliary handle 41 can be in a common plane with the drilling axis 412' of the opened collar 2 when the opened collar 2 is secured to drill 101. In this manner, the center axis 411 is also in a common plane with drilling axis 103 of chuck 102 of drill 101. The auxiliary handle 41 can be detached from the drill 101 or rotated around drill 101 when the clamp means 3 is loosened (via bolt 31 and nut 32), and be secured on the shoulder of drill 101 when the clamp means 3 is tightened (via bolt 31 and nut 32).

Figure 2:
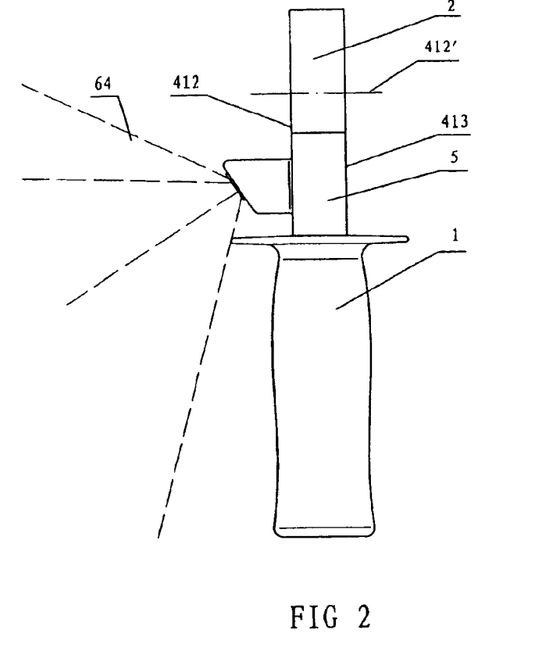
FIG. 2 is a right side view of the auxiliary drill handle shown in FIG. 1.
Figure 2A:
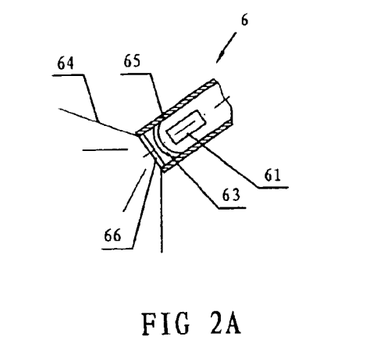
FIG. 2A is a preferred embodiment of the laser generator.
Figure 4:
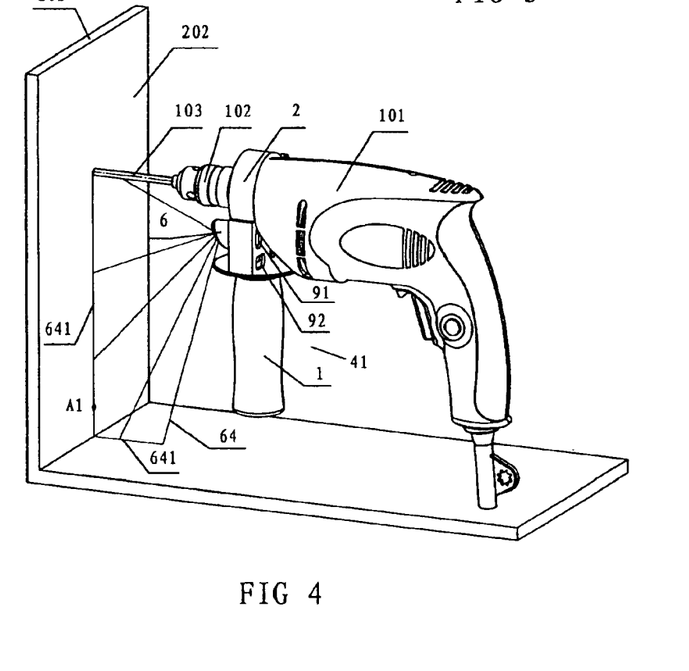
FIG. 4 is a perspective view of the auxiliary handle with a laser alignment device as shown in FIG. 1 installed on a drill.

As shown in FIG. 2A, the laser generator 6 comprises a housing 65, a laser diode 61, a set of lens 63 which first focuses the divergent light projected by laser diode 61 and then transforms the focused light to a fanned planar beam 64, and an elongate aperture 66 on the front of housing 65 through which laser beam 64 projects out. The fanned planar beam 64 travels through drilling axis 103 of drill chuck 102, as shown in FIG. 4, and forms a line 641 on surface 202 of work piece 201, such that the operator can drill a hole at any position of line 641 aligned to any reference point A1 at line 641.

Figure 1:
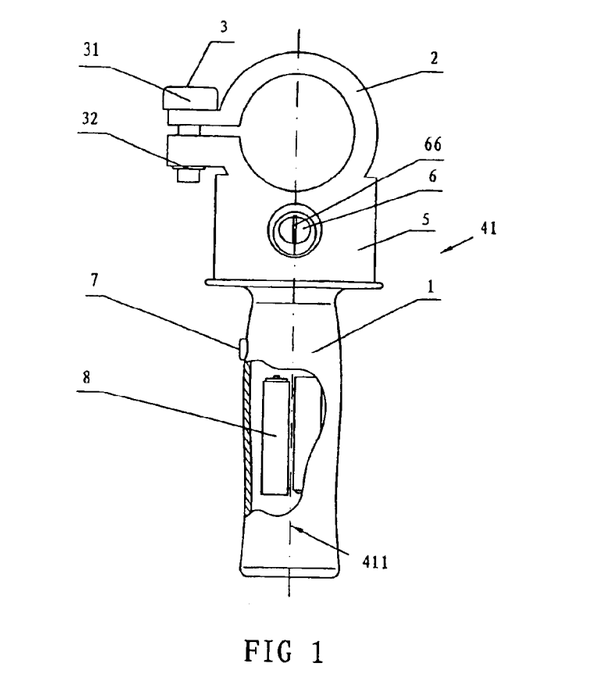
FIG. 1 illustrates a front view of a preferred embodiment of an auxiliary drill handle with a laser alignment device.
Figure 3:
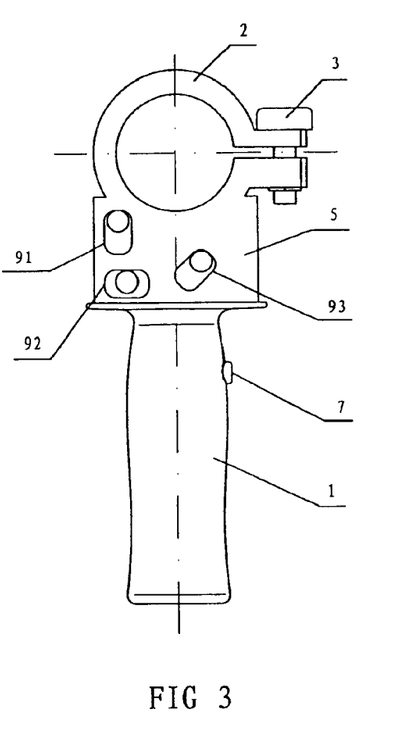
FIG. 3 is a rear view of the auxiliary handle with a laser alignment device.

A level bubble (or a plurality of level bubbles) can be mounted on the back 413 of auxiliary handle 41 shown in FIG. 1, i.e. mounted on the plane face to the operator when handle 41 is being installed on drill 101. The bubble can be parallel, vertical or 45 degrees to fanned planar beam 64, such as level bubbles 91, 92 and 93 shown in FIG. 3. The manufacture can select to mount only one or two of the bubbles 91, 92, 93 on the auxiliary handle 41, or mount three bubbles. FIG. 3 is the rear view of an auxiliary handle 41 with all three level bubbles 91, 92 and 93 being mounted on its back 413. When it is required to drill a hole on a vertical wall, the operator needs only to adjust drill 101 or auxiliary handle 41 by corresponding level bubbles, that is, to adjust laser line 641 on the wall, and accurately position a hole vertically, horizontally or by 45 degrees aligned to a reference point.

Figure 5:
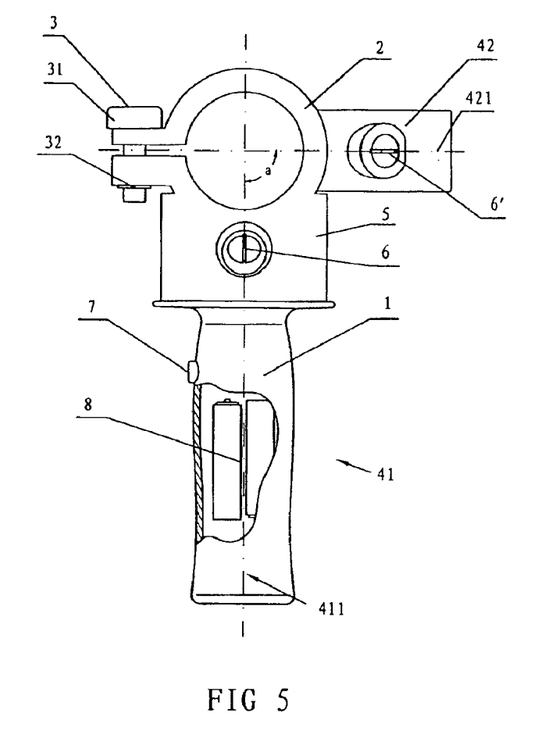
FIG. 5 is a front view of the auxiliary handle with a laser alignment device with a sub-handle mounted thereto.
Figure 8:
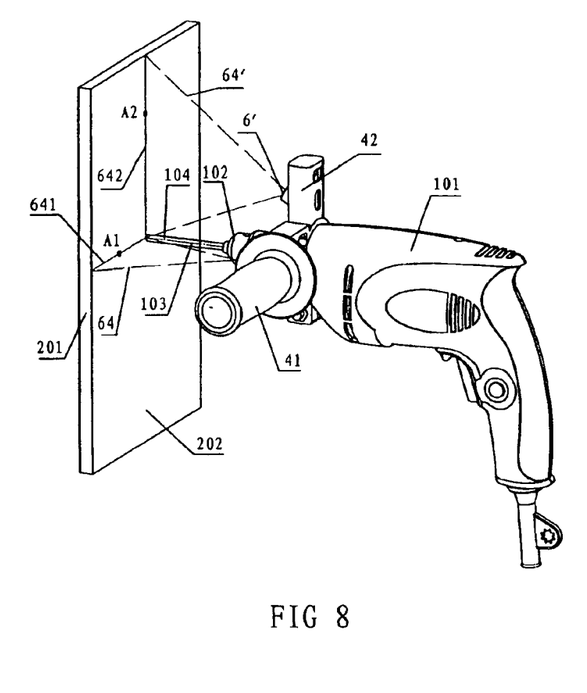
FIG. 8 is a perspective view of a drill with a sub-handle perpendicular to the auxiliary handle.

Referring to FIG. 5, auxiliary handle 41 can also include a sub-handle 42, whose central axis 421 is perpendicular to central axis 411 of auxiliary handle 41. Central axis 421 may intersect central axis 412' of opened collar 2. Sub-handle 42 comprises a second laser generator 6' which is similar to the first laser generator 6. Second laser generator 6' may also be powered by battery pack 8, and controlled by switch 7 on auxiliary handle 6. Fanned beam 64' projected by second laser generator 6' travels through central axis 103 of drill chuck 102. Thus, two fanned planar beams 64, 64' projected by the first and second laser generator 6, 6' on the relevant auxiliary handle 41 and sub-handle 42 form two lines 641, 642 which are perpendicular to each other on surface 202 of work piece 201, and the intersection point formed by the two lines lap over drill bit 104 as shown in FIG. 8.

Figure 6:
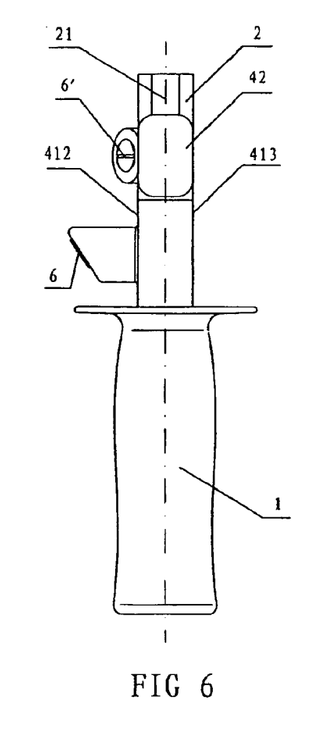
FIG. 6 is a right side view of the auxiliary handle with a laser alignment device shown in FIG. 5.

It is preferred that the angle formed by sub-handle 42 and auxiliary handle 41 may be adjustable, as shown in FIG. 6, the manner to fix the sub-handle on opened collar 2 of auxiliary handle 41 may be a curved notch 21 on the outer circumference of collar 2. Thus, the angle formed by two central axis 411, 421 can be adjusted as required. It is preferred that sub-handle 42 may be adjusted relative to auxiliary handle 41 such that the angle is from 90 to 180 degrees, or any angle therebetween. In a preferred embodiment, collar 2 may be marked with some scale marks wherein it is 90, 135 or 180 degrees relative to fanned beam 64 projected by first laser generator 6.

Figure 7:
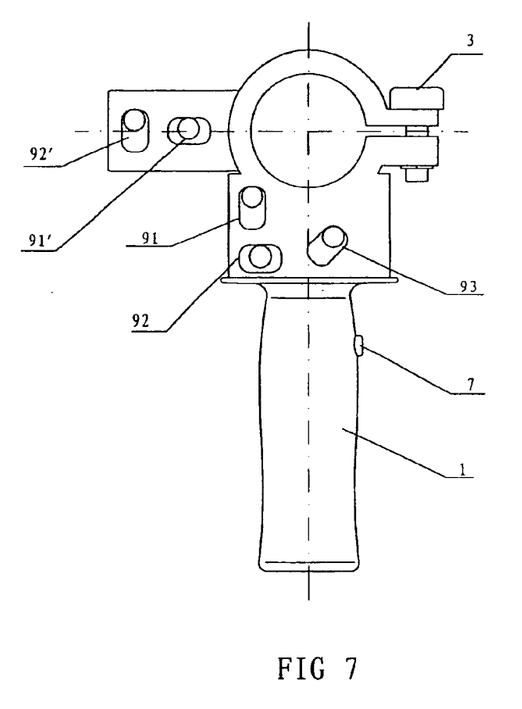
FIG. 7 is a rear view of the auxiliary handle with a laser alignment device as shown in FIG. 5.

As shown in FIG. 7, two level bubbles 91',92' which are horizontal and vertical to the laser beam 64' can be mounted on sub-handle 42 individually or together, respectively to indicate the position of laser line 642 relative to the horizontal plane.

By combination of different bubbles on the auxiliary handle 41 and sub-handle 42, it is possible to position a reference point or a series of reference points along a line on a non-horizontal surface more accurately at a line which is horizontally, vertically or 45 degrees aligned to a reference point.

Referring to FIG. 4, by turning on switch 7 on auxiliary handle 41, laser generator 6 will project a fanned planar laser beam 64 which travels through the central axis 103 of chuck 102 of drill 101 and forms a line 641 on surface 202. One can obtain an exact plumb laser line 641 by rotating auxiliary handle 41 to approximately make laser beam 64 vertical, then level with bubble 92. Then, the operator can drill a hole or a series of holes along line 641 on which reference point A1 is positioned.

Similarly, the user can rotate auxiliary handle 41 around drill 101 to a position convenient for grasping, and adjust the laser beam 64 to an approximately horizontal plane, and then level auxiliary handle 41 with bubble 91 to obtain an exact horizontal line 641.

When the reference object is a line itself, the user only need to align the laser beam to the reference line, and then position the chuck 102 of the drill 101 at a point along the laser beam to drill a hole accurately.

Similarly, the level bubbles can be mounted on the auxiliary handle with other degrees relative to the center axis of the auxiliary handle to obtain different positioning lines.

Figure 9:
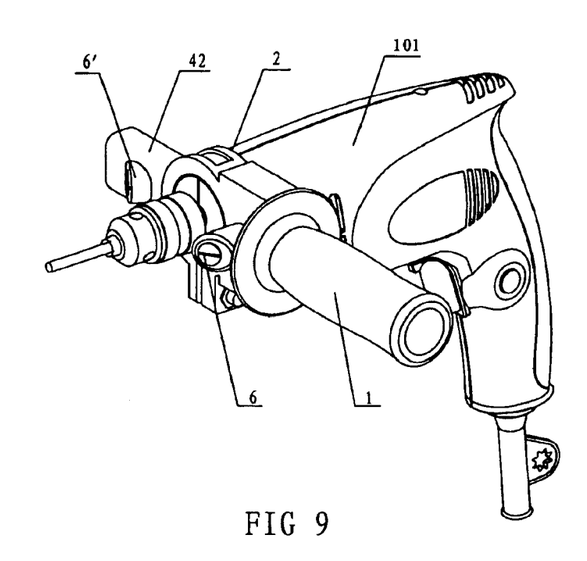
FIG. 9 is a perspective view of a drill with a sub-handle aligned with the auxiliary handle.
Figure 10:
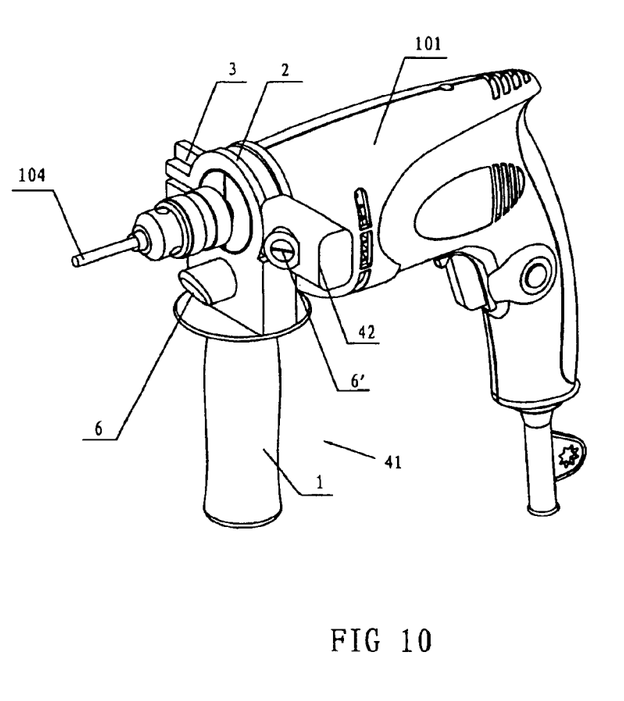
FIG. 10 is a front perspective view with the auxiliary handle shown in FIG. 8 turned approximately 90 degrees.

Referring to FIG. 8, when sub-handle 42 is perpendicular to the auxiliary handle 41, laser lines 641, 642 projected by first and second laser generator 6, 6' can be aligned to first and second references A1, A2 respectively. By leveling the auxiliary handle 41 to make laser line 641 horizontal and laser line 642 vertical, the user can then drill at the intersection point of laser lines 641, 642. Referring to FIGS. 9 and 10, sub-handle 42 can be adjustable around the auxiliary handle 41, which can also be adjusted relative to drill 101, so the user can position a drill hole with different references.

Figure 11:
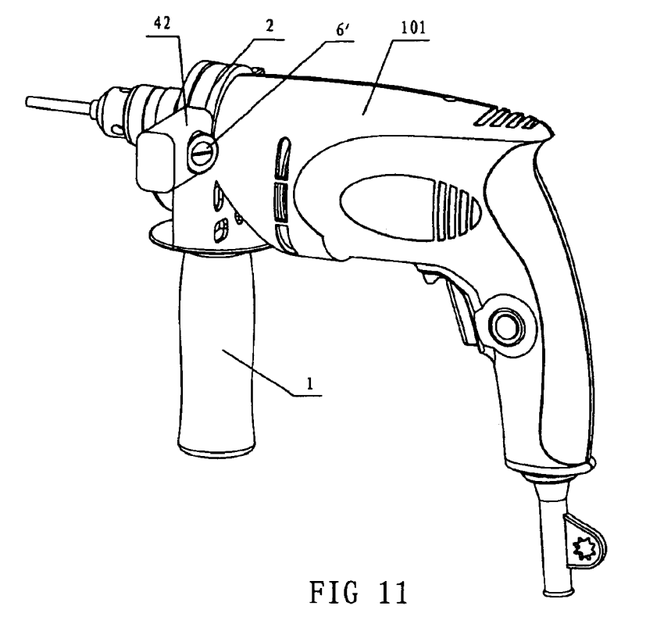
FIG. 11 is a rear perspective view when the laser generator of the sub-handle projects a laser beam backward to the drill.
Figure 12:
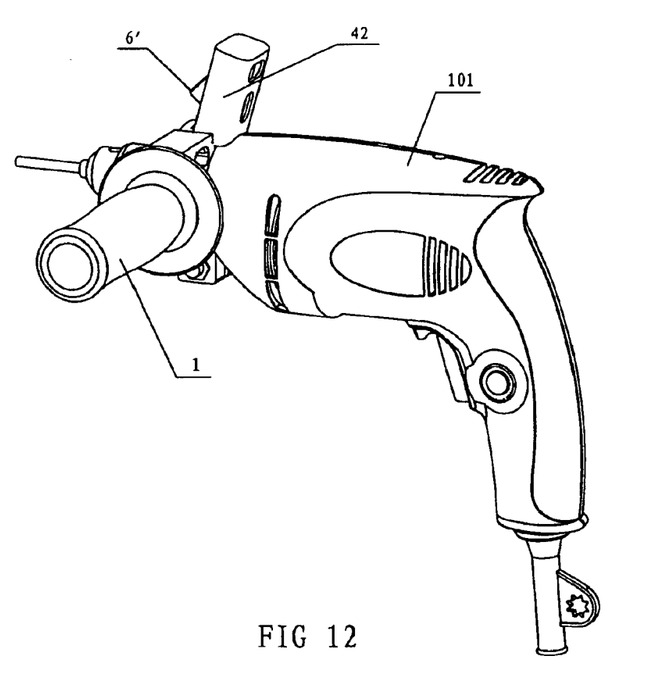
FIG. 12 is a perspective view with the sub-handle tilted backward.

Referring to FIG. 11, sub-handle 42 can also be designed so that it can be detached from and then mounted reversely on auxiliary handle 41 to make laser generator 6' turn 180 degrees backward. Or, it can be supplied with a universal joint, not shown in the figure, to enable sub-handle 42 to rotate about the central axis of itself of 180 degrees. In another embodiment, as best illustrated in FIG. 12, sub-handle 42 can be constructed so that it can lean backward to extend the projection distance of the laser beam. When the elevation angle reaches 90 degrees, sub-handle 42 will be parallel to central axis 103 of chuck 102. When the reference point or line is not on the same surface to be drilled, or is too far away from the hole to be attached by the laser beam, first secure sub-handle 42 on auxiliary handle 41 with a confirmed angle a when they are in the same plane, and then tilt sub-handle 42 backward as desired. For instance, when it is required to drill a hole on a vertical wall, the operator may take one point on this wall as one reference point, adjust sub-handle 42, and then to position a hole referencing a second point, which is on the other wall, ceiling or floor as desired.

While some exemplary embodiments have been disclosed herein, it will be understood by those skilled in the art that the present invention is not limited to the examples discussed above, but may be changed or modified without departing from the spirit or scope of the invention. To mount another one or more sub-handles with the laser generator on the auxiliary handle, as an example, is within the scope of the invention.

I claim:

1. An auxiliary handle with a laser alignment device for a drill, comprising:
   a handle grip;
   an adjustable collar having a central axis;
   a first laser generator to project a visible fanned laser beam in a common plane with the central axis of the collar.

2. The auxiliary handle of claim 1, comprising a sub-handle with a second laser generator to project a visible fanned laser beam in a common plane with the central axis of the collar.

3. The auxiliary handle of claim 2, wherein the sub-handle has a central axis and is provided with a universal joint for rotating the sub-handle about its central axis.

4. The auxiliary handle of claim 3, wherein the sub-handle may be rotated 180 degrees about its central axis.

5. The auxiliary handle of claim 2, wherein the fanned laser beam from the first laser generator intersects the fanned laser beam from the second laser generator.

6. The auxiliary handle of claim 2, wherein the sub-handle is rotatable about the auxiliary handle.

7. The auxiliary handle of claim 6, wherein the sub-handle is rotatable about the auxiliary handle from about 90 degrees to about 180 degrees.

8. The auxiliary handle of claim 2, wherein the collar has an outer curved circumference with a groove therein, the sub-handle being attached to the collar in the groove and being rotatable about the outer curved circumference of the collar groove.

9. The auxiliary handle of claim 1, wherein the first laser generator comprises:
   a housing having an aperture at one end;
   a laser diode positioned within the housing for generating a laser light; and
   a laser lens for focusing the laser light to a fanned planar beam and projecting the beam through the aperture in the housing.

10. The auxiliary handle of claim 1 further comprising at least one level bubble.

11. The auxiliary handle of claim 1 further comprising means for clamping the auxiliary handle to the drill.

12. The auxiliary handle of claim 11, wherein the means for clamping comprises cooperating flanges at opposite ends of the collar, the flanges having an opening therein, a bolt positioned within the opening and a threaded nut for loosening and tightening the collar on the drill.

13. An auxiliary handle for connecting to a power tool having a chuck, the handle comprising:
   a handle grip;
   means for attaching the auxiliary handle to the power tool; and
   a laser generator for projecting a visible fanned laser beam in a common plane with a central axis of the chuck.

14. A power drill comprising:
   a first handle integrally connected to a housing;
   an electric motor disposed within the housing;
   a drill chuck powered by the electric motor; and
   an auxiliary handle attached to the housing, the auxiliary handle comprising a handle grip and a first laser generator that projects a visible fanned laser beam in a common plane with a central axis of the drill chuck.

15. The power drill of claim 14, wherein the auxiliary handle is rotatably attached to the housing.

16. The power drill of claim 14, wherein the auxiliary handle comprises a sub-handle having a second laser generator.

17. The power drill of claim 16, wherein the sub-handle has a central axis and is provided with a universal joint for rotating the sub-handle about its central axis.

18. The power drill of claim 17, wherein the sub-handle may be rotated 180 degrees about its central axis.

19. The power drill of claim 16, wherein the first laser generator projects a fanned laser beam, which intersects a fanned laser beam projected from the second laser generator.

20. The power drill of claim 16, wherein the sub-handle is rotatable about the auxiliary handle.

21. The power drill of claim 16, wherein the sub-handle is rotatable about the auxiliary handle from an angle of about 90 degrees to about 180 degrees.

* * * * *

UNITED STATES PATENT AND TRADEMARK OFFICE
CERTIFICATE OF CORRECTION

PATENT NO. : 6,898,860 B2  
APPLICATION NO. : 10/712317  
DATED : May 31, 2005  
INVENTOR(S) : Shuming Wu

Page 1 of 1

It is certified that error appears in the above-identified patent and that said Letters Patent is hereby corrected as shown below:

Column 5, line 44     after "angle" delete "a" and insert instead the symbol -- α --

Signed and Sealed this

First Day of August, 2006

JON W. DUDAS  
*Director of the United States Patent and Trademark Office*